United States Patent [19]
Heim et al.

[11] Patent Number: 5,476,904
[45] Date of Patent: Dec. 19, 1995

[54] THERMOPLASTIC ELASTOMERS HAVING IMPROVED HEAT RESISTANCE COMPRISING CONJUGATED DIENE/METHYL METHACRYLATE BLOCK COPOLYMERS

[75] Inventors: Philippe Heim; Bruno Vuillemin, both of Pau, France; Philippe Teyssie, Neuville en Condroz, Belgium; Philippe Bayard, Stavelot; Jinshan Wang, Liege, Belgium

[73] Assignee: Elf Atochem S.A., Puteaux, France

[21] Appl. No.: 158,395

[22] Filed: Nov. 29, 1993

[30] Foreign Application Priority Data

Nov. 27, 1992 [FR] France ................... 92 14318

[51] Int. Cl.⁶ .................. C08F 297/02; C08F 295/00
[52] U.S. Cl. .................. 528/299; 525/308; 525/309; 526/174; 526/175
[58] Field of Search .................. 525/308, 309, 525/299; 526/174, 175

[56] References Cited

U.S. PATENT DOCUMENTS

| | | | |
|---|---|---|---|
| 3,285,894 | 10/1963 | Lin | 525/271 |
| 3,439,064 | 4/1969 | Malowski et al. | 525/272 |
| 4,461,874 | 7/1984 | Teyssie | 525/271 |

FOREIGN PATENT DOCUMENTS

| | | |
|---|---|---|
| 0402219 | 12/1990 | European Pat. Off. . |
| 2387255 | 11/1978 | France . |
| 1003543 | 10/1963 | United Kingdom . |
| 0138073 | 10/1979 | United Kingdom . |
| 138069 | 10/1979 | United Kingdom . |
| WO90/15084 | 12/1990 | WIPO . |

OTHER PUBLICATIONS

Wiles, et al. The Butyllithium Initiated Polymerization of Methyl Methacrylate J. of Phys. Chem, v. 68, N. 7, 1964, pp. 1983–1987.

*Primary Examiner*—Joseph L. Schofer
*Assistant Examiner*—I. Zemel
*Attorney, Agent, or Firm*—Burns, Doane, Swecker & Mathis

[57] ABSTRACT

Thermoplastic, elastomeric, conjugated diene (e.g., butadiene)/methyl methacrylate block copolymers having elevated Tg and improved impact strength, well suited as polymer impact strength-modifiers and for conversion into pressure-sensitive adhesives, are prepared by (a) anionically polymerizing a conjugated diene monomer in an apolar solvent medium to provide a living polydiene, (b) next adding an alkali metal alkoxyalcoholate ligand to the medium comprising the living polydiene thus formed, (c) block copolymerizing the step (b) living polydiene with methyl methacrylate comonomer to provide a living copolymer, and (d) reacting the step (c) living copolymer with at least one protonic compound, e.g., water, alcohol and/or acid, and completing the polymerization thereof, with the proviso that polymerization of the conjugated diene and the methyl methacrylate comonomers is strictly carried out in the apolar solvent medium, in particular in toluene, benzene or ethylbenzene.

21 Claims, No Drawings

THERMOPLASTIC ELASTOMERS HAVING IMPROVED HEAT RESISTANCE COMPRISING CONJUGATED DIENE/METHYL METHACRYLATE BLOCK COPOLYMERS

BACKGROUND OF THE INVENTION

1. Field of the Invention

The present invention relates to the preparation, via particular anionic polymerization, of block copolymers comprising polydiene blocks and polymethyl methacrylate blocks. The subject block copolymers are thermoplastic elastomers and have improved heat resistance and impact strength.

2. Description of the Prior Art

It is known to this art to prepare thermoplastic elastomeric copolymers, especially SBS (polystyrene/butadiene/styrene) and SEBS (polystyrene/hydrogenated butadiene/styrene). However, their limiting temperature of application is less than 70° C. and 80°–100° C., respectively. Beyond these limits the copolymer softens and loses its shape.

Attempts have been made to prepare thermoplastic elastomeric copolymers comprising at least one block having a higher glass transition temperature. Thus, Belgian Patent 759,737 describes thermoplastic elastomeric copolymers of formula A-B-C in which A and/or C is an inelastic polymer sequence prepared from acrylic monomers and which has a glass transition temperature higher than 100° C. These blocks have an average molecular weight ranging from 200 to 20,000, preferably less than 18,000 and, in particular, less than 15,000, especially polymethyl methacrylate ($\overline{Mn}$ =1,600 in the Table). The block B may be prepared from a conjugated diene such as butadiene, preferably butadiene having a high content of cis-1,4-configuration. To prepare these copolymers, via anionic polymerization, an initiator of the alkyllithium type is employed in an apolar solvent medium, such as cyclohexane.

It will thus be appreciated that the average molecular weights of the acrylic blocks described in this '737 patent are low, which presents the disadvantage of decreasing mechanical strength. This may be explained by the fact that the efficiency of initiation of polymerization of methyl methacrylate (MMA) in a purely apolar medium (cyclohexane) is very low, even at very low temperature (−78° C.) and that secondary reactions ensue due to the attack by the anions of the ester groups of the MMA monomer present in solution, or on the polymethyl methacrylate chains (PMMA) already formed. Indeed, when the MMA monomer is present with the butadiene anion, for example, polymerization occurs, but the anion preferentially attacks the esters rather than the double bond. A short PMMA polymer chain is therefore obtained. Moreover, this '737 patent is silent in respect of glass transition temperatures (Tg). Under the conditions described for the preparation of such polymers, the PMMA block should be isotactic and should have a low Tg, for example 60°–70° C.

FR-A-2,679,237, assigned to the assignee hereof, describes an initiator system for the anionic polymerization of (meth)acrylic monomers to prepare, in particular, block copolymers comprising hard/soft/hard blocks and also PMMA structural units containing a high percentage of syndiotactic triads, imparting a glass transition temperature on the order of 130° C. to the polymer. The preparation of copolymers comprising polymethyl methacrylate and polydiene blocks is not described.

Polymers comprising syndiotactic polymethyl methacrylate and polybutadiene blocks are also known to this art. However, their preparation requires a change of solvent (for example toluene and then THF) and the reaction is carried out at low temperature (−78° C.). These conditions are not suitable on an industrial scale. Moreover, the addition of large amounts of THF, for example after the formation of the polybutadiene "living" structural unit may result in its deactivation by reaction with the residual impurities present in the solvent. This results in the formation of an impure product (mixture of copolymer and homopolymer).

SUMMARY OF THE INVENTION

Accordingly, a major object of the present invention is the provision, via anionic polymerization, of block thermoplastic elastomeric copolymers comprising a polydiene block, in particular, polybutadiene having a high content of 1,4-(cis or trans) configuration and at least one polymethyl methacrylate block which has a high glass transition temperature (greater than or equal to 120° C., preferably greater than 125° C.).

Another object of the present invention is the provision of such process that can be carried out on an industrial scale, especially at higher temperature and taking account of the incompatibility of the solvents for the polymerization of dienes, especially of butadiene, and of methyl methacrylate.

Briefly, the present invention features the preparation, via anionic polymerization, of copolymers containing a polydiene block and at least one polymethyl methacrylate (PMMA) block having a glass transition temperature greater than or equal to 120° C., and which comprises:

(a) polymerizing the conjugated diene monomer employing an anionic initiator to provide a living polydiene structural unit, (b) next adding to the medium of polymerization a ligand of formula ROM in which M is an alkali metal and R is a radical $R^1(OR^2)_m$ in which $R^1$ is a linear or branched alkyl radical or an arylalkyl or alkylaryl radical, the alkyl moiety thereof having from 1 to 6 carbon atoms, $R^2$ is a linear or branched alkylene radical having from 2 to 6 carbon atoms and m is an integer 1, 2 or 3, (c) reacting the living polydiene structural unit produced in step (b) with the MMA monomer to form a living copolymer, and (d) then reacting such step (c) living copolymer with at least one protonic compound, with the proviso that the polymerization of the diene and MMA monomers is strictly carried out in an apolar solvent medium.

DETAILED DESCRIPTION OF BEST MODE AND PREFERRED EMBODIMENTS OF THE INVENTION

More particularly according to the present invention, unsubstituted or substituted dienes having from 4 to 12 carbon atoms are suitable conjugated diene monomers, especially isoprene, dimethylbutadiene and butadiene. Butadiene is the preferred.

The initiators may be selected from among the conventional initiators of anionic polymerization. These, for example, may be monofunctional or difunctional, permitting the preparation of di- or triblock copolymers.

The monofunctional initiators are typically organic compounds derived from alkali or alkaline earth metals and in which the organic radical is an alkyl, aryl or arylalkyl radical, particularly diphenylmethylsodium, diphenylmethylpotassium, diphenylmethyllithium, n-butyllithium, sec-butyllithium, n-butylsodium, 1,1-diphenylhexyllithium and 1,1-diphenyl-3-methylpentyllithium.

The difunctional initiators may be selected, for example, from among 1,1,4,4-tetraphenyl-1, 4-dilithiobutane and 1,1, 4,4-tetraphenyl-1, 4-disodiobutane. They can also be the reaction products of an alkyllithium such as butyllithium with diisopropenylbenzene (DIB), bis(p-isopropenylphenyl)alkanes, 2(n-1)-diphenylalkadienes, or any other such compound described in U.S. Pat. No. 4,200,718.

Exemplary ligands having the above formula are those in which $R^1$ is a methyl, ethyl, butyl, or benzyl radical, preferably methyl, $R^2$ is ethylene, propylene, butylene, or isopropylene, preferably ethylene, M is lithium, sodium or potassium, preferably lithium, and m is preferably equal to 2. Particularly preferred are lithium methoxyethanolate and lithium methoxyethoxyethanolate.

The molar ratio of the ligand to the initiator may vary over very wide limits. The amount of ligand depends on the initiator and on the monomer(s) to be polymerized. The ligand/initiator molar ratio for carrying out the process of the invention advantageously ranges from 1 to 50, and preferably from 1 to 10.

Any apolar solvent, especially toluene, benzene or ethylbenzene, can be employed as the solvent(s). A mixture of these solvents can also be used. These solvents can also be employed in combination with cyclohexane, particularly when the initiator is prepared in situ. In this instance, it is preferable to employ as little cyclohexane as possible, since, as indicated above, the polymerization of MMA in the presence of cyclohexane is difficult to control.

In a preferred embodiment of this invention, a compound of the diphenylethylene (DPE) or α-methylstyrene type may be added during the step (a) of polymerization of the conjugated diene, or in step (b) during the addition of the ligand. This permits avoiding the secondary reactions between the ester functional group of the MMA and the carbanion obtained in step (a).

The temperature of polymerization of the conjugated diene advantageously ranges from 0° C. to 100° C. and, preferably, from 0° C. to 70° C. The temperature of polymerization of the MMA monomer advantageously ranges from −50° C. to +60° C. and preferably from −30° C. to +20° C.

The duration of polymerization of the conjugated diene depends on the temperature and on the monomer and initiator concentration and advantageously ranges, for example, from 0.5 to 24 hours and, preferably, from 0.5 h to 5 h. The duration of polymerization of the MMA is very short and advantageously ranges, for example, from 10 s to 1 hour, and preferably from 1 min to 15 min.

The protonic compound added at the end of polymerization to deactivate the copolymer is advantageously selected, especially, from among water, alcohols and acids; acidified methanol is particularly preferred.

The residual sites of unsaturation of the polydiene block can then be at least partially reduced by the usual hydrogenation techniques in order to improve certain properties, especially stability to ultraviolet light.

To recover the copolymer, it can be precipitated in methanol and dried in vacuum at ambient temperature. It is then converted into granular or powder form.

The final product copolymer has a number-average molecular weight which is directly proportional to the monomer/initiator ratio by weight.

The polymers prepared via the process according to the invention comprise (a) a polybutadiene block of number-average molecular weight of from 5,000 to 500,000 and preferably from 9,000 to 150,000 and in which the 1,4-(cis or trans) configuration content is greater than 75% and preferably greater than or equal to 80%, and its glass transition temperature is lower than −25° C. and preferably ranges from −75° C. and −90° C., and (b) at least one PMMA block of number-average molecular weight of from 5,000 to 500,000 and preferably from 7,000 to 200,000. The PMMA block contains a percentage of syndiotactic triads which is greater than or equal to 75%. Its glass transition temperature is higher than 120° C., preferably higher than 125° C. The copolymer exhibits good elastomeric properties and good heat resistance.

The copolymers prepared by the process according to the invention can be treated or converted by processes which are typically employed for thermoformable materials, for example extrusion or injection molding, to produce shaped articles such as fibers, coatings and shoes. They can also be used in pressure-sensitive adhesives. Too, they can be employed as agents capable for improving the impact strength of various other polymers such as polymethyl methacrylate, polystyrene, polyvinyl chloride and polycarbonate. They can also be used in combination with reinforcing materials, such as plasticizers, stabilizers, colorants and fillers.

All of these polymers are particularly advantageous, especially because of their good heat resistance which makes them suitable for any use under which they will be subjected to elevated temperatures.

In order to further illustrate the present invention and the advantages thereof, the following specific examples are given, it being understood that same are intended only as illustrative and in nowise limitative.

EXAMPLE 1

Polybutadiene-b-PMMA diblock copolymer:

$5 \times 10^{-4}$ Mol of sec-butyllithium, followed by 0.09 mol of butadiene, were added at 0° C. to 150 ml of toluene purified beforehand. Polymerization was permitted to proceed for 24 hours.

The reaction mixture was cooled to −30° C. and $5 \times 10^{-3}$ mol of lithium methoxyethoxyethanolate and $5 \times 10^{-4}$ mol of diphenylethylene were added, diluted in 15 ml of toluene. A dark red color developed.

After 15 min, 0.05 mol of MMA, distilled beforehand in the presence of triethylaluminum, was added. The reaction was stopped after 15 min by adding 1 ml of a mixture of methanol and hydrochloric acid (50/50 by volume).

The copolymer was precipitated in methanol. After drying in vacuum at ambient temperature, the copolymer was obtained in a 98% yield.

Analysis evidenced the following characteristics:

Polybutadiene block (analysis performed on the block before MMA addition):

(i) $\overline{Mn}$ =19,400 (determined by GPC, relative to polystyrene standards), (ii) Polydispersity index (PI) =1.1, (iii) Microstructure: 86% cis- or trans-, 14% vinyl, (iv) Tg =−78° C.

Polybutadiene-PMMA block copolymer:
(i) $\overline{Mn}$ =28,700 (determined by GPC, relative to polystyrene standards),
(ii) Polydispersity index (PI) =1.1,
(iii) Tacticity: Syndiotactic triads: 80%, Heterotactic triads: 20%, Isotactic triads: 0%,
(iv) Tg =130° C.

EXAMPLE 2

Polybutadiene-b-PMMA diblock copolymer $7.5 \times 10^{-4}$ Mol of sec-butyllithium, followed by $7.5 \times 10^{-3}$ mol of α-methylstyrene, were added at 30° C. to one liter of toluene dried beforehand over CaH$_2$. 1.1 Mol of butadiene was then added and polymerization was permitted to proceed for 2 h, 30 min. After the temperature of the reaction mixture had been decreased to 0° C., $7.5 \times 10^{-3}$ mol of lithium methoxyethoxyethanolate was added, diluted in 50 ml of toluene.

0.4 mol of MMA was then added. The reaction was stopped after 15 min by adding 1 ml of acidified methanol.

The copolymer was precipitated in methanol. After drying in vacuum at ambient temperature, the copolymer was obtained in a 95% yield.

Analysis evidenced the following characteristics:
Polybutadiene block (analysis performed on the block before MMA addition):
(i) $\overline{Mn}$ =150,000 (obtained by GPC relative to polystyrene standards),
(ii) Polydispersity index (PI) =1.15,
(iii) Microstructure: 80% cis- or trans-, 20% vinyl,
(iv) Tg =–76° C.
Polybutadiene-PMMA block copolymer:
(i) $\overline{Mn}$ =173,000 (obtained by GPC relative to polystyrene standards),
(ii) Polydispersity index (PI) =1.2,
(iii) Tacticity: Syndiotactic triads: 77%, Heterotactic triads: 22%, Isotactic triads: 1%
(iv) Tg =128° C.

EXAMPLE 3

PMMA/polybutadiene/PMMA triblock copolymer:

$4.6 \times 10^{-4}$ Mol of diisopropenylbenzene (DIB) was added as difunctional initiator to 70 ml of cyclohexane previously distilled over polystyryllithium, followed by $9.24 \times 10^{-4}$ mol of sec-butyllithium. The reaction mixture was heated to 50° C. for 2 hours.

500 ml of toluene previously distilled over polystyryllithium were then added. The temperature of the reaction mixture was adjusted to 0° C. 0.3 Mol of butadiene was then added and the reaction mixture was permitted to polymerize for 24 hours.

$9.24 \times 10^{-4}$ Mol of diphenylethylene and $9.24 \times 10^{-3}$ mol of lithium methoxyethoxyethanolate, diluted in 25 ml of toluene, were added to the reaction mixture. The mixture was cooled to –30° C. and 0.047 mol of MMA distilled over triethylaluminum was added.

After 15 min, the reaction was stopped by adding 1 ml of acidified methanol.

The mixture was precipitated in methanol. After drying in vacuum at ambient temperature, the triblock copolymer was recovered in 100% yield.

Analysis evidenced the following characteristics:
Polybutadiene block (analysis performed on the block before MMA addition):
(i) $\overline{Mn}$ =77,000 (determined by GPC relative to polystyrene standards),
(ii) Polydispersity index (PI) =1.12,
(iii) Microstructure: 90% cis- or trans-, 10% vinyl,
(iv) Tg =82° C.
Polybutadiene-PMMA block copolymer:
(i) $\overline{Mn}$ =127,000 (determined by GPC relative to polystyrene standards),
(ii) Polydispersity index (PI) =1.17,
(iii) Tacticity: Syndiotactic triads: 78%, Heterotactic triads: 22%, Isotactic triads: 0%,
(iv) Tg =128° C.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a thermoplastic, elastomeric, conjugated diene/methyl methacrylate block copolymer having improved heat resistance, comprising (a) anionically polymerizing a conjugated diene monomer in an apolar solvent medium to provide a living polydiene, (b) next adding an alkali metal alkoxyalcoholate ligand to the medium comprising the living polydiene thus formed, (c) block copolymerizing the step (b) living polydiene with methyl methacrylate comonomer, also in said apolar solvent medium, to provide a living copolymer, and (d) reacting the step (c) living copolymer with at least one protonic compound and completing the polymerization thereof, with the proviso that polymerization of said conjugated diene and said methyl methacrylate comonomers is carried out essentially exclusively in said apolar solvent medium.

2. A process for the preparation of a thermoplastic, elastomeric, conjugated diene/methyl methacrylate block copolymer having improved heat resistance, which comprises (a) anionically polymerizing a conjugated diene monomer in an apolar solvent medium to provide a living polydiene, (b) next adding a ligand of formula ROM to the medium comprising said living polydiene, in which M is an alkali metal and R is a radical $R^1(OR^2)_m$ wherein $R^1$ is a linear or branched alkyl, arylalkyl or alkylaryl radical, the alkyl moiety of which having from 1 to 6 carbon atoms, $R^2$ is a linear or branched alkylene radical having from 2 to 4 carbon atoms and m is an integer 1, 2 or 3, (c) reacting the step (b) living polydiene with methyl methacrylate comonomer, also in said apolar solvent medium, to provide a living copolymer, and then (d) reacting the step (c) living copolymer with at least one protonic compound and completing the polymerization thereof, with the proviso that polymerization of said conjugated diene and said methyl methacrylate comonomers is carried out essentially exclusively in said apolar solvent medium.

3. The process as defined by claim 2, which comprises (a) anionically polymerizing said conjugated diene monomer in the presence of a monofunctional or difunctional initiator therefor.

4. The process as defined by claim 2, said conjugated diene comprising isoprene, dimethylbutadiene or butadiene.

5. The process as defined by claim 4, said conjugated diene comprising butadiene.

6. The process as defined by claim 2, said ligand comprising lithium methoxyethanolate or lithium methoxyethoxyehtanolate.

7. The process as defined by claim 3, said anionic polymerization initiator comprising diphenylmethylsodium, diphenylmethylpotassium, diphenylmethyllithium, n-butyllithium, sec-butyllithium, n-butylsodium, 1,1-diphenylhexyllithium or 1,1-diphenyl-3-methylpentyllithium.

8. The process as defined by claim 3, said anionic polymerization initiator comprising 1,1,4,4-tetraphenyl-1,4-dilithiobutane, 1,1,4,4-tetraphenyl-1,4-disodiobutane, or the product of reaction of an alkyllithium with diisopropenylbenzene, a bis(p-isopropenylphenyl)alkane or a 2(n-1)-diphenylalkadiene.

9. The process as defined by claim 2, comprising adding α-methylstyrene or diphenylethylene to said apolar solvent medium during steps (a) or (b).

10. The process as defined by claim 2, said apolar solvent medium comprising toluene, benzene or ethylbenzene.

11. The process as defined by claim 10, said apolar solvent medium also comprising cyclohexane.

12. The process as defined by claim 3, wherein the ligand/initiator molar ratio ranges from 1 to 50.

13. The process as defined by claim 12, said molar ratio ranging from 1 to 10.

14. The process as defined by claim 1, further comprising hydrogenating the block copolymer thus prepared.

15. The process as defined by claim 2, said at least one protonic compound comprising water, an alcohol and/or an acid.

16. The process as defined by claim 15, said at least one protonic compound comprising acidified methanol.

17. The process as defined by claim 2, comprising polymerizing said conjugated diene at a temperature ranging from 0° to 100° C.

18. The process as defined by claim 17, comprising polymerizing said conjugated diene for from 0.5 hour to 24 hours.

19. The process as defined by claim 18, comprising polymerizing said conjugated diene at a temperature ranging from 0° C. to 70° C. for from 0.5 hour to 5 hours.

20. The process as defined by claim 17, comprising polymerizing said methyl methacrylate at a temperature ranging from −50° C. to 60° C.

21. The process as defined by claim 20, comprising polymerizing said methyl methacrylate at a temperature ranging from −30° to 20° C. for from 1 min to 15 min.

* * * * *